3,055,900
PYRIMIDO PYRIMIDINES AND PROCESS OF MAKING SAME
Jean Druey, Riehen, Paul Schmidt, Therwil, and Kurt Eichenberger and Max Wilhelm, Basel, Switzerland, assignors to Ciba Corporation, a corporation of Delaware
No Drawing. Filed Dec. 3, 1958, Ser. No. 777,858
Claims priority, application Switzerland Dec. 6, 1957
13 Claims. (Cl. 260—256.4)

The present invention provides 7-amino-pyrimido [4,5-d]pyrimidines (and methods for their preparation) containing the nucleus of the formula

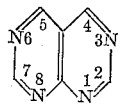

or their tautomeric forms, and salts of such compounds.

The amino group in the new compounds is in the first place a mono- or di-substituted amino group, in which the substituents may be selected from aromatic, heterocyclic, araliphatic, heterocyclic-aliphatic, cycloaliphatic or aliphatic radicals. Such substituents are especially lower alkyl, cycloalkyl or alkylene radicals, which may be interrupted in the carbon chain by hetero atoms such as oxygen, sulfur or nitrogen. Thus the amino group may be, for example, a lower mono- or di-alkylamino, e.g. methylamino, ethylamino, dimethylamino, diethylamino, etc., tertiary-aminoalkylamino, e.g. di-lower alkylamino- lower alkylamino, pyrrolidino- lower alkylamino, piperidino- lower alkylamino, morpholino- lower alkylamino, piperazino- lower alkylamino, etc., or it may be a pyrrolidino, piperidino, morpholino or piperazino group. The amino group may also contain inorganic substituents, for example, it may form a hydrazino group.

The new compounds may optionally contain further substituents, especially in the 2-, 4- and/or 5-positions, free, etherified or esterified hydroxy groups, free or substituted amino or mercapto groups, or lower alkyl radicals.

Etherified hydroxy groups are above all lower alkoxy groups such as a methoxy group, whereas esterified hydroxy groups are especially halogen atoms, for example, chlorine or bromine. As substituted amino groups there may be mentioned in the first place those described above. As substituted mercapto groups there may be mentioned above all alkyl (especially lower alkyl) mercapto groups, for example, the methyl mercapto group.

When the new compounds contain tautomeric hydrogen atoms, which are found on the ring nitrogen atoms, these can be substituted, advantageously by lower aliphatic radicals, such as lower alkyl or amino lower alkyl radicals, for example, a methyl group, an ethyl group, an aminomethyl group, an aminoisopropyl group, etc.

The new compounds possess valuable properties. They exhibit diuretic, coronary-dilating, and anti-rheumatic effects and effects on the central nervous system. They, thus, find application as therapeutic agents or as intermediate products.

Quite especially valuable are the compounds of the formula

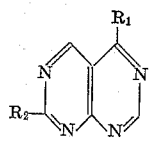

in which $R_1$ represents a free hydroxy, mercapto or amino group and $R_2$ represents a lower dialkyl-amino or alkyleneamino group, such as the dimethylamino group, as well as the corresponding 4-alkoxy- or 3-alkyl-4-oxo-3,4-dihydro-compounds, such as 4-hydroxy-7-dimethylamino-pyrimido-[4,5-d]pyrimidine, 4 - mercapto - 7 - dimethylamino-pyrimido[4,5-d]pyrimidine, 4-methoxy-7-dimethylamino-pyrimido[4,5-d]pyrimidine and 3-methyl - 4-oxo-7-dimethylamino - 3,4 - dihydro-pyrimido[4,5-d]pyrimidine, and also their salts.

The new compounds may be obtained in known manner, if in a pyrimido[4,5-d]pyrimidine which contains in the 7-position a radical convertible into an amino group this radical is so converted, or from 2-amino-pyrimidines, which contain in the 4- and 5-positions substituents suitable for the synthesis of a pyrimido[4,5-d]pyrimidine-ring system, by synthesis to form the pyrimido[4,5-d]pyrimidine ring. As substituents convertible into amino groups there may be mentioned in the first place halogen atoms, such as chlorine or bromine, or free or etherified mercapto groups, such as the methylmercapto group, which by reaction with ammonia or amines may be converted into free or substituted amino groups.

2-amino-pyrimidines suitable for the synthesis of the pyrimido[4,5-d]pyrimidine-ring system are especially those which contain in the 4-position a free amino group and in the 5-position a free or functionally converted carboxyl group. The amino group in the 2-position may be dialkylamino or alkyleneamino, particularly di-lower alkylamino and alkyleneamino in which there are 5 or 6 ring members. Thus the 2-amino group may be, inter alia, dimethylamino, diethylamino, diisopropylamino, piperidino, morpholino, pyrrolidino, etc. The synthesis may be accomplished by reacting these compounds with carboxylic acids, advantageously in the form of their functional derivatives, provided that at least one of the reaction components contains an at most mono-substituted amino group as part of a functionally converted carboxylic group. Functionally converted carboxyl groups in the pyrimidine nucleus are, for example, the nitrile group or an esterified or amidated or thioamidated carboxyl group, while as carboxylic acids, there may be used especially lower aliphatic carboxylic acids such as formic, acetic or carbonic acid, advantageously in the form of their functional derivatives, such as formamide, urea, isocyanates, isothiocyanates, thiourea, guanidine, phosgene, urethane, acetamidine or acetic anhydride.

Thus 2-dimethylamino-4-amino-pyrimidine-5-nitrile or -carboxylic acid amide may be condensed with formamide to 4-amino- or -hydroxy-7-dimethylamino-pyrimido [4,5-d]pyrimidine.

The above-mentioned reactions may be carried out directly or in stages.

In the 7-amino-pyrimido[4,5-d]pyrimidines so obtained further substituents may in the usual manner, be introduced, converted, or replaced by hydrogen.

More especially, hydroxyl groups in the 2-, 4-, or 5-position may be replaced by halogen atoms, for example, by treatment with halogenating agents, such as phosphoric acid halides, for example, phosphorus oxy-chloride or phosphorus pentabromide. Halogen atoms in the mentioned positions may be replaced by free mercapto groups or by substituted e.g. etherified-hydroxy- or mercapto-groups, for example, alkoxy-, alkylmercapto- or amino-alkyl-oxy groups particularly where the alkyl portion of the substituent is lower alkyl. To this end, they may be reacted with thiourea or metal (particularly alkali metal) mercaptides, -mercaptanes or -alcoholates. By treatment with ammonia or amines such halogen atoms may be exchanged for amino groups. Free amino, hydroxy- or mercapto-groups may be substituted in the usual manner, for example, by lower alkyl or aminoalkyl radicals. Free hydroxyl groups may be replaced by mercapto groups for example by reaction with sulfurizing agents, such as phosphorus pentasulfide. Free or etherified mercapto groups may by reaction with ammonia or amines by converted into the corresponding amino groups. In so far as the compounds so obtained contain tautomerizing hydrogen atoms, as, for example, 7-amino-2:4- and/or 5-hydroxy-pyrimido[4,5-d]pyrimidines, these may be substituted in the usual manner, for example by lower alkyl or amino alkyl radicals.

The introduction of organic radicals into hydroxy-, mercapto- or amino- groups or into ring nitrogen atoms may advantageously be effected by reaction with the reactive esters of the corresponding alcohols, especially esters of hydrogen halides (e.g. hydrogen chloride, hydrogen bromide, etc.), sulfuric acids or organic sulfonic acids, for example, benzene sulfonic acids, advantageously in the presence of condensation agents or with the use of metal salts of the pyrimido-pyrimidines.

Halogen atoms or thio-groups in the 2-, 4- and/or 5-positions may also be replaced by hydrogen in known manner.

The above mentioned conversions in the pyrimido-pyrimidines may be carried out separately or in combination with one another.

The invention also comprises modifications of the process in which a compound obtainable as an intermediate product at any stage in the process is used as starting material and the remaining process steps are carried out; or in which the process is terminated at any stage; or process modifications in which the reaction components are formed under the conditions of the reaction.

As starting material and reaction components there are used especially those which will yield the end products already mentioned above. The starting materials, insofar as they are new, may be made by methods known in themselves.

The pyrimidines used as starting material can be obtained, for example, by condensation of a suitably substituted amidine with a carbonyl- or carboxyl- group-carrying malonic acid, if desired in the form of a functional acid and/or carbonyl derivative, and, if desired, with suitable modification of the substituents in the pyrimidine product. Such reactions are described in our Serial No. 777,847 filed concurrently herewith. Thus, for example, an S-alkyl-isothiourea is reacted with ethoxy-methylene-malonic nitrile to the 2-alkylmercapto-4-amino-5-cyano-pyrimidine, in which the alkylmercapto group may be exchanged by treatment with ammonia or an amine, such as dimethylamine.

The above mentioned reactions may be carried out in the presence or absence of diluents and/or condensation agents, if desired at a raised temperature, in an open vessel, or if desired in a closed vessel, optionally under pressure.

According to the substituents present in the products of the process different salts may be prepared. Thus, when the products contain a free hydroxyl or mercapto group, metal salts can be obtained, for example, by solution in alkali (e.g. sodium, potassium, lithium etc.) hydroxide. Compounds of a basic character form salts with inorganic or organic acids. As salt-forming acids there come into consideration, for example; hydrogen halides (e.g. hydrogen chloride, bromide), sulfuric acid, phosphoric acids, nitric acid, perchloric acid; aliphatic, alicyclic, aromatic or heterocyclic carboxylic- or sulfonic acids, such as, formic-, acetic-, propionic-, oxalic-, succinic-, glycolic-, lactic-, malic-, tartaric-, citric-, ascorbic-, hydroxy maleic-, dihydroxy maleic-, or pyruvic-acid; phenyl acetic-, benzoic-, para-aminobenzoic-, anthranilic-, para-hydroxy-benzoic, salicylic- or para-amino salicylic-acid; methane sulfonic-, ethane sulfonic-, hydroxyethane sulfonic- or ethylene sulfonic-acid; toluene sulfonic-acid, naphthalene sulfonic acids or sulfanilic acid; methionine, tryptophane, lysine or arginine.

The above described pyrimido-pyrimidines, their salts or corresponding mixtures find application, for example in the form of pharmaceutical preparations. These preparations contain the said compounds in admixture with or in conjunction with pharmaceutical organic or inorganic carriers suitable for enteral, parenteral or topical application. As carriers there come into consideration such materials as do not react with the pyrimido-pyrimidines as, for example, water, gelatine, lactose, starch, magnesium stearate, talc, vegetable oils, benzyl alcohol, gums, polyalkylene glycols, cholesterol or other known medicinal carriers. The pharmaceutical preparations may be made up, for example, as tablets, dragees, or in liquid form as solutions, suspensions or emulsions. If desired they can be sterilized and/or may contain compatible auxiliary substances, such as preserving agents, stabilizing agents, wetting agents or emulsifying agents. They may also contain other therapeutically useful substances. The preparations may be made up in accordance with customary methods.

The following examples illustrate the invention:

*Example 1*

16.3 grams of 2-dimethylamino-4-amino-5-cyanopyrimidine are heated with 40 grams of formamide for 5 hours in a bath at 200–210° C. After cooling, the reaction mixture is taken up in 100 cc. of hot 2-N-hydrochloric acid, the small quantity of undissolved matter is removed by filtration with suction, the filtrate is cooled and the precipitated product separated by filtration with suction. 4-amino - 7 - dimethylaminopyrimido[4,5 - d]pyrimidine hydrochloride of the formula

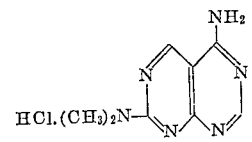

is obtained as brownish crystals melting at 330–332° C. (with decomposition). The 2-dimethylamino-4-amino-5-cyanopyrimidine used as starting material may be obtained as follows: Solutions of 11.2 grams of potassium hydroxide in 70 cc. of methanol and of 44 grams of S-methylisothiourea hydroiodide in 200 cc. of methanol, cooled to 0° C., are mixed together. 25 grams of ethoxy methylene-malonic nitrile are then added at a temperature of 8–12° C., stirred for 2 hours at room temperature and the precipitate obtained is separated by suction-filtering. The precipitated product is recrystallized from a large quantity of ethanol. 2-methylmercapto-4-amino-5-cyano-pyrimidine of the formula

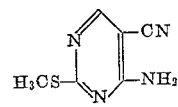

is obtained as white crystals, melting point 235–237° C.

10 grams of 2-methyl mercapto-4-amino-5-cyano-pyrimidine are heated together with 70 cc. of liquid dimethylamine in a closed tube for 6 hours at 90–100° C. After evaporating off the excess dimethylamine the residue is recrystallized from dimethyl formamide. 2-dimethylamino-4-amino-5-cyano-pyrimidine of the formula

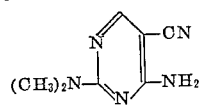

is obtained as white crystals of melting point 233–235° C. Its hydrochloride melts at 253–255° C. (with decomposition).

*Example 2*

18.1 grams of 2-dimethylamino-4-amino-5-carbamyl-pyrimidine are heated with 40 grams of formamide for 4 hours. The mixture is cooled, the precipitated product separated by filtration with suction, dissolved in 300 cc. of 2-N-caustic soda, the solution filtered with suction to remove the small quantity of undissolved matter, and precipitated carefully by treatment with 2-N-hydrochloric acid to a pH of 7. 4-hydroxy-7-dimethylamino-pyrimido[4,5-d]pyrimidine of the formula

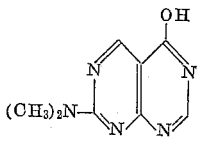

is obtained as white crystals of melting point 335° C. (with decomposition).

The 2-dimethylamino-4-amino-5-carbamyl-pyrimidine used as starting material is obtained as follows:

10 grams of 2-dimethylamino-4-amino-5-cyano-pyrimidine are boiled with 200 cc. of 2-N-caustic soda solution and 200 cc. of ethanol for 3 hours under reflux. The resulting solution is cooled and suction-filtered to separate the precipitated 2-dimethylamino-4-amino-5-carbamyl-pyrimidine of the formula

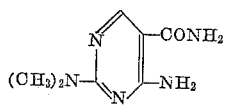

which melts at 289°–290° C. and forms a hydrochloride melting at 293° C. (with decomposition).

Example 3

19 grams of 4-hydroxy-7-dimethylamino-pyrimido[4,5-d]pyrimidine are dissolved in 75 cc. of 2-N-caustic soda solution. The solution is then mixed slowly, while stirring, with 14 grams of dimethyl sulfate and stirring is continued for 10 hours at room temperature. The precipitate formed is separated by filtration with suction and crystallized from ethanol. 4-methoxy-7-dimethylamino-pyrimido[4,5-d]pyrimidine of the formula

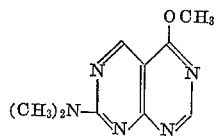

is obtained as white crystals melting point 226–227° C. It forms a hydrochloride melting at 312° C. (with decomposition).

The aqueous mother liquor as described above is extracted several times with chloroform. After evaporating off the chloroform the radical is recrystallized from ethanol. 3 - methyl - 4 - oxo - 7 - dimethylamino - 3:4-dihydropyrimido[4,5-d]pyrimidine of the formula

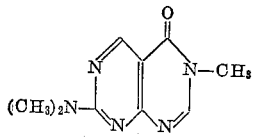

is obtained as white crystals of melting point 218–220° C.

Example 4

9 g. of 4-hydroxy-7-dimethylamino-pyrimido[4,5-d]pyrimidine and 12 g. of phosphorus pentasulfide are boiled in 200 cc. of pyridine, and heated in a bath of 130° C. for 6 hours. The hot pyridine solution is then poured into 1500 cc. of water. On standing, a brown precipitate forms which is then dissolved in dilute caustic soda solution, treated with animal carbon, precipitated by means of dilute hydrochloric acid and recrystallized from much methanol to obtain 4-mercapto-7-dimethylamino-pyrimido[4,5-d]pyrimidine of the formula

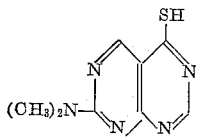

in the form of yellow crystals of melting point 300° C.

Example 5

7 g. of 7-methylmercapto-4-hydroxy-pyrimido[4,5-d]pyrimidine are heated at 110° C. for 6 hours with 20 cc. of piperidine. The resulting precipitate is filtered off and recrystallized from dimethyl formamide. There is obtained 7-piperidino-4-hydroxy-pyrimido[4,5-d]pyrimidine of the formula

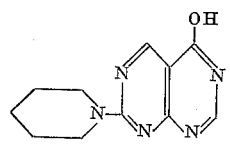

in the form of white crystals of melting point 312–314° C.

The 2-methylmercapto - 4 - hydroxy-pyrimido[4,5-d]pyrimidine used as starting material can be prepared as follows:

60 g. of 2-methylmercapto-4-amino-5-carbamyl-pyrimidine are heated at 130° C. for 4 hours with 55 g. of orthoformic acid ester and 400 cc. of acetic anhydride. The resulting precipitate is filtered off and dissolved in 2 N-caustic soda solution. On addition of 2 N-hydrochloric acid to the alkaline solution, the 7-methylmercapto-4-hydroxy-pyrimido[4,5-d]pyrimidine of the formula

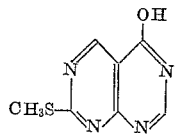

precipitates. It melts at 315–318° C.

What is claimed is:

1. 7-lower alkyl mercapto-4-hydroxy-pyrimido[4,5-d] pyrimidine.
2. 4-hydroxy-7-dimethylamino - pyrimido[4,5-d]pyrimidine.
3. 4-amino-7 - dimethylamino - pyrimido[4,5-d]pyrimidine.
4. 4-methoxy-7-dimethylamino - pyrimido[4,5-d]pyrimidine.
5. 3-methyl-4-oxo-7-dimethylamino-3,4-dihydro-pyrimido[4,5-d]pyrimidine.
6. 4-mercapto-7-dimethylamino-pyrimido[4,5-d]pyrimidine.
7. A compound having the formula

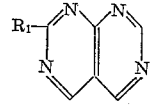

wherein $R_1$ represents a member selected from the group consisting of amino and lower alkyl amino.

8. A member of the group consisting of compounds of the formula:

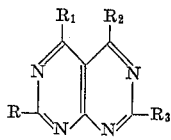

and their therapeutically useful acid addition salts, wherein R stands for a member selected from the group consisting of mono- and di-lower alkylamino-, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino and hydrazino and $R_1$ and $R_2$ stand for a member selected from the group consisting of amino, mono- and di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino, hydrazino, hydroxy, mercapto, lower alkoxy, halogen, lower alkyl and lower alkyl mercapto and $R_3$ for a member selected from the group consisting of amino, mono- and di-lower alkylamino, mono- and di-cycloalkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino, hydrazino, hydroxy, mercapto, lower alkoxy, halogen, lower alkyl, lower alkylmercapto and hydrogen.

9. A member of the group consisting of compounds of the formula:

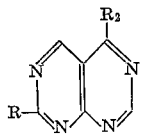

and their therapeutically useful acid addition salts, wherein R stands for a member selected from the group consisting of mono- and di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino, and hydrazino and $R_2$ stands for a member selected from the group consisting of di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino, mercapto, and lower alkylmercapto.

10. A member of the group consisting of compounds of the formula:

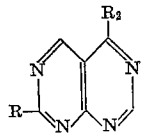

and their therapeutically useful acid addition salts, wherein R stands for a member selected from the group consisting of mono- and di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino, and hydrazino and $R_2$ stands for a member selected from the group consisting of mono-lower alkylamino, amino and hydroxy.

11. A member of the group consisting of compounds of the formula:

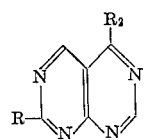

and their therapeutically useful acid addition salts, wherein R stands for a member selected from the group consisting of mono- and di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino and hydrazino and $R_2$ stands for a member selected from the group consisting of lower alkyl, lower alkoxy, hydrazino and halogen.

12. A member of the group consisting of compounds of the formula:

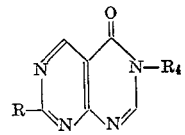

and their therapeutically useful acid addition salts, wherein R stands for a member selected from the group consisting of mono- and di-lower alkylamino, mono- and di-cyclo-lower alkylamino, di-lower alkylamino-lower alkylamino, pyrrolidino-lower alkylamino, piperidino-lower alkylamino, morpholino-lower alkylamino, piperazino lower alkylamino, pyrrolidino, piperidino, morpholino, piperazino and hydrazino and $R_4$ is lower alkyl.

13. A therapeutically useful acid addition salt of the compound of claim 2.

References Cited in the file of this patent

UNITED STATES PATENTS 2,949,466    Hoefle et al. _____ Aug. 16, 1960

OTHER REFERENCES

Nesbitt: Jour. Chem. Soc., London, 1954, pages 3057–3059.

Hull: Jour. Chem. Soc. (London), 1957, pages 4845–4848.

Mautner: Jour. Org. Chemistry, volume 23, pages 1450–1452 (1958).

Taylor et al.: Jour. Amer. Chem. Soc., volume 80, pages 421–431 (1958).